UNITED STATES PATENT OFFICE.

PHILIPP OTT, OF ELBERFELD, PRUSSIA, GERMANY, ASSIGNOR TO THE FARBENFABRIKEN, VORMALS FR. BAYER & CO., OF SAME PLACE.

AZO DYE.

SPECIFICATION forming part of Letters Patent No. 423,569, dated March 18, 1890.

Application filed September 12, 1889. Serial No. 323,742. (Specimens.) Patented in England May 3, 1889, No. 7,314, and May 9, 1889, No. 7,802, and in France May 3, 1889, No. 184,799.

*To all whom it may concern:*

Be it known that I, PHILIPP OTT, doctor of philosophy, a subject of the German Emperor, residing at Elberfeld, Prussia, German Empire, have invented certain new and useful Improvements in the Manufacture of Direct Dyeing Coloring-Matters from Diamidodiphenylene Oxide and Diamidoditoluylene Oxide, (patented in England May 3, 1889, No. 7,314, and May 9, 1889, No. 7,802, and in France May 3, 1889, No. 184,799;) and I do hereby declare the following to be a full, clear, and exact description of the invention, such as will enable others skilled in the art to which it appertains to make and use the same.

The invention relates to the production of substantive dyes, and more especially to the production of such dyes from diamidodiphenylene oxide and diamidoditoluylene oxide. I have discovered that these diamines can be readily obtained by melting ortho-benzidine disulpho-acid and ortho-tolidine disulpho-acid with soda. These paradiamines form soluble tetrazo compounds that will react with two molecules of an amine or phenol, or their sulpho or carbo or their sulpho-carbo acids, and will form new dye-stuffs like the tetrazo compounds of benzidine, tolidine, &c.

By combining the tetrazo compounds of diamidodiphenylene oxide and diamidoditoluylene oxide with two molecules of an amine, or a phenol or their sulpho or carbo acids or their sulpho-carbo acids, the dye-stuff is produced at once; but if these tetrazo compounds are combined with one molecule only intermediate products are obtained that are not dye-stuffs, but that can be converted into such by combining them with another molecule of an amine or phenol or their sulpho or carbo acids or their sulpho-carbo acids. In this manner I obtain so-called "mixed coloring-matter."

The dye-stuffs derived from diamidodiphenylene oxide and diamidoditoluylene oxide, and more especially those obtained from their combination with amidosulpho-acids, differ greatly from the dye-suffs derived from benzidine and tolidine, in that they are of finer and bluer shades.

In carrying out my invention I proceed as follows: Diamidodiphenylene oxide and diamidoditoluylene oxide are diazotized in a hydrochloric-acid solution containing the theoretical quantity of sodium nitrite. The resulting tetrazo compounds are allowed to flow into two molecules of an amine or phenol or their sulpho or carbo or sulpho-carbo acids, the amides being coupled in an acetic-acid solution and the phenols in an alkaline solution. The product of the coupling with an amine is allowed to stand for some time, the reaction being finally completed by heating to about 80° centigrade, after which it is neutralized with soda-lye and the dye-stuff salted out. The phenol dye-stuffs, on the other hand, form immediately, and are isolated by treatment with common salt, in a well-known manner, and dried.

In order to obtain mixed dye-stuffs, one molecule of the tetrazo compound of diamidodiphenylene oxide or diamidoditoluylene oxide is caused to react upon one molecule of an amine or phenol or the sulpho or carbo or sulpho-carbo acids thereof in an acetic-acid solution. The intermediate product formed is combined with one molecule of any other amine or phenol or their sulpho or carbo or sulpho-carbo acids, the amines being likewise coupled in an acetic-acid solution and the phenols in an alkaline solution and treated as above set forth.

If the amines and phenols employed have no sulpho or carbo acid group, dye-stuffs are obtained by the above-described process, which are insoluble in water and are rendered soluble by sulphonation. To this end one part of the dye-stuff is introduced into three parts, by weight, of fuming sulphuric acid and the resulting melt allowed to stand until it is found on trial to readily dissolve in alkaline water. The melt is then poured on ice and the separated dye-stuff acid converted into dye-stuff by dissolving in alkali.

The following examples will more clearly show the manner of carrying out my invention.

*Dye-stuff from diamidodiphenylene oxide and two molecules of alpha-naphthylamine.*—
I add to a solution of twenty-five kilograms of alpha-naphthylamine in hydrochloric acid a solution of tetrazo-diphenylene oxide containing ten kilograms of nitrite, which is readily obtained by causing the required quantity of a solution of sodium nitrite to flow into the hydrochloric-acid solution of the diamidodiphenylene oxide. By the addition of acetate of soda to the tetrazo compound the formation of the dye-stuff takes place. After standing for twelve hours the temperature is raised to about 80° centigrade, and the mixture is acidulated and filtered off. The dye-stuff thus obtained dissolves in alcohol with a bluish-red color. In order to render this dye-stuff soluble, ten parts, by weight, are combined with thirty parts, by weight, of fuming sulphuric acid containing twenty per centum of anhydrous acid of about 15° to 30° centigrade, and the melt is allowed to stand until it is found on test to dissolve readily in alkaline water. The melt is then poured on ice and the separated dye-stuff acid filtered off and converted into dye-stuff by solution in an alkaline lye. From this the dye-stuff is isolated by means of common salt. It dyes cotton a bluish-red.

*Dye-stuff from diamidodiphenylene oxide and two molecules of alpha-naphthylamine-monosulpho acid.*—A solution of the tetrazo compound of diamidodiphenylene oxide, corresponding to ten kilograms of nitrite, is combined with an acetic-acid solution of forty-five kilograms of alpha-naphthylamine monosulpho-acid. After standing for twenty-four hours the mixture is heated to 80° cengrade and alkalinized by the addition of soda-lye. It is then salted out, filtered, and dried. The dye-stuff also dyes cotton a bluish-red.

*Dye-stuff from diamidoditoluylene oxide and two molecules of alpha-naphthol monosulpho-acid.*—The tetrazo compound of the diamidoditoluylene oxide, obtained in the same manner as that of the diamidodiphenylene oxide and corresponding to ten kilograms of sodium nitrite, is poured into a solution of forty kilos alpha-naphthol monosulpho-acid and kept alkaline by means of carbonate of sodium, and the dye-stuff is salted out. It dyes cotton violet.

*Dye-stuff from diamidodiphenylene oxide and one molecule of alpha-napthol monosulpho-acid and one molecule of alpha-naphthylamine monosulpho-acid.*—The tetrazo compound of the diamidodiphenylene oxide containing ten parts, by weight, of sodium nitrite, is caused to flow into an acetic-acid solution of sixteen parts, by weight, of alpha-naphthylamine monosulpho-acid. After standing for three or four hours an intermediate product is formed, which is then introduced into an alkaline solution of twenty-five parts, by weight, of alpha-naphthol monosulpho-acid. The dye-stuff forms at once and is separated by filtration and dried. It dyes cotton direct with a Bordeaux-like color.

*Dye-stuff from diamidoditoluylene oxide and one molecule of alpha-naphtylamine monosulpho-acid and one molecule of resorcin.*—In this case the tetrazo compound of diamidodiphenylene oxide of the preceding example is replaced by a corresponding quantity of the tetrazo compound of diamidoditoluylene oxide, and the intermediate product, diamidoditoluylene oxide and one molecule of alpha-naphthylamine monosulpho-acid obtained, which is introduced into an alkaline solution of twenty-five kilos of resorcin, and a fine red dye-stuff is obtained.

Having described my invention, what I claim, and desire to secure by Letters Patent, is—

1. The herein-described process of obtaining substantive dye-stuffs from diamidodiphenylene oxide and from diamidoditoluylene oxide, which consists in combining one molecule of their tetrazo compounds with two molecules of an amine or phenol or their sulpho or carbo acids or their sulpho-carbo acids.

2. The herein-described process of obtaining substantive dye-stuffs from intermediate products not dye-stuffs in themselves, derived from diamidodiphenylene oxide and from diamidoditoluylene oxide, which consists in combining the tetrazo compounds of the latter with one molecule of an amine or a phenol, or their sulpho or carbo or their sulpho-carbo acids, and combining the product of the reaction with another molecule of an amine or a phenol or their sulpho or carbo acids or their sulpho-carbo acids.

In testimony whereof I affix my signature in presence of two witnesses.

PHILIPP OTT.

Witnesses:
CARL KRIEGER,
CARL DUNSBERG.